UNITED STATES PATENT OFFICE.

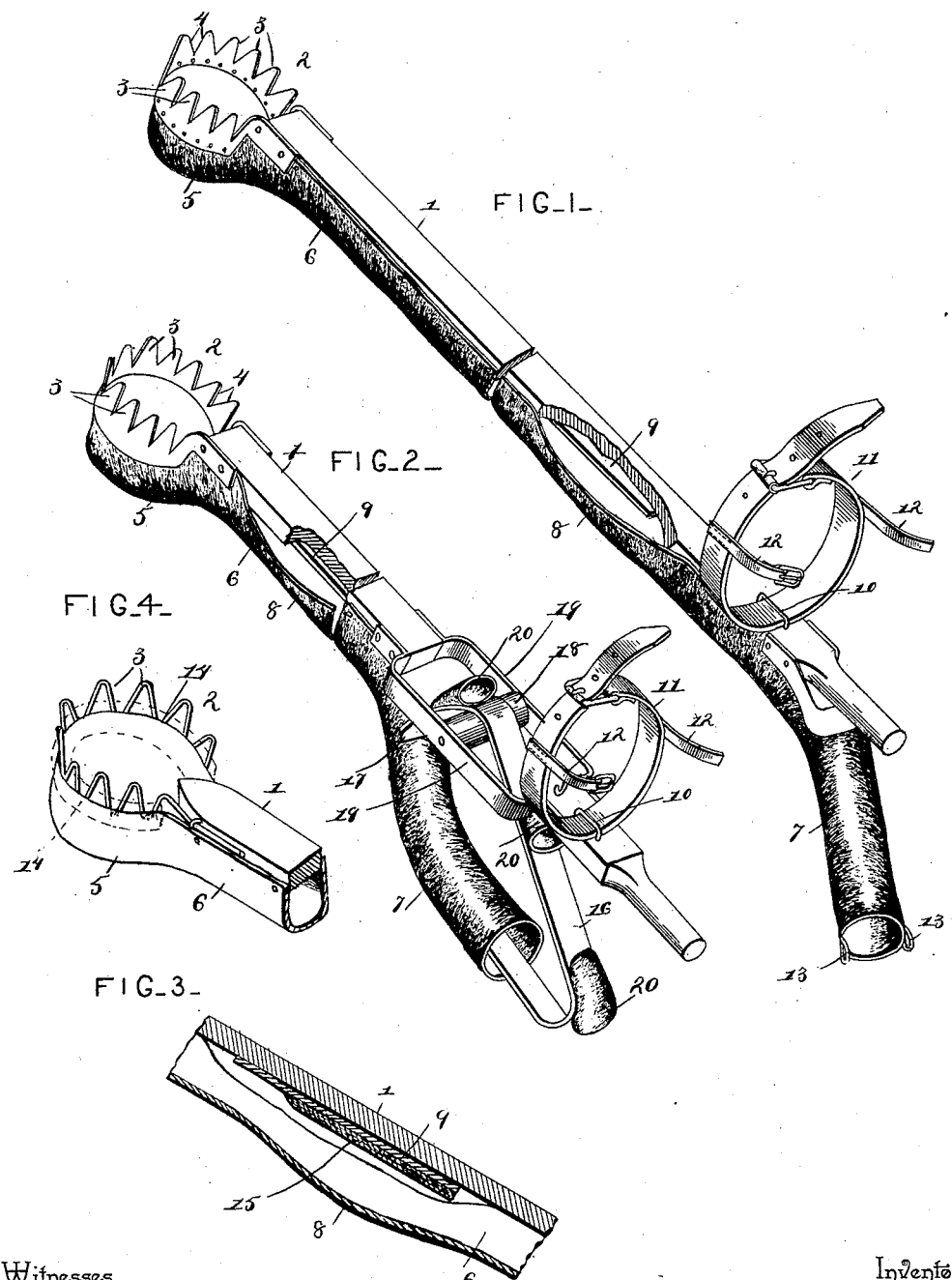

JOSEPH G. HARRIS, OF NEAR SEDALIA, MISSOURI.

FRUIT-GATHERER.

SPECIFICATION forming part of Letters Patent No. 452,704, dated May 19, 1891.

Application filed June 17, 1890. Serial No. 355,795. (No model.)

*To all whom it may concern:*

Be it known that I, JOSEPH G. HARRIS, a citizen of the United States, residing near Sedalia, in the county of Pettis and State of Missouri, have invented certain new and useful Improvements in Fruit-Pickers, of which the following is a specification, reference being had therein to the accompanying drawings.

This invention relates to fruit-pickers; and it has for its object to provide a device of this class which shall be simple in construction, and by means of which fruits—such as apples, pears, peaches, and the like—may be gathered easily and conveniently and without danger of being bruised.

The invention consists in the improved construction, arrangement, and combination of parts, which will be hereinafter fully described, and particularly pointed out in the claims.

In the drawings hereto annexed, Figure 1 is a perspective view of a fruit-picker constructed in accordance with my invention. Fig. 2 is a perspective view illustrating a modification. Fig. 3 is a longitudinal sectional view of a portion of the device shown in Fig. 1. Fig. 4 is a perspective detail view illustrating a modification in the construction of the head of the fruit-picker.

Like numerals of reference indicate like parts in all the figures.

To the upper end of a handle, which is designated by 1, is secured an approximately circular head 2, having a series of fingers 3. Said fingers and head may be formed of sheet metal, and the recesses between the said fingers may be sharpened so as to form the cutting-edges 4, or the said head may be formed of a single piece of wire bent so as to form the fingers 3, as shown in Fig. 4 of the drawings. To the said head is secured a pocket or receptacle 5, having a downwardly-extending sleeve 6, which is suitably secured for the greater portion of its length to the handle 1, at the lower end of which it terminates in the delivery-tube 7. A portion of the sleeve a short distance above the lower end of the handle is unattached to the latter, as will be seen at 8 in Figs. 1, 2, and 3 of the drawings. Suitably secured to the under side of the handle, directly at or above the unattached portion of the sleeve, is a spring 9, which extends into said sleeve and constitutes a stop in the passage formed by the latter. The handle is provided near its lower end with a staple 10, in which is mounted a shoulder-strap 11 for supporting the device during operation. Said shoulder-strap is provided with auxiliary straps 12, adapted to support a bag or other receptacle which may in practice be attached to loops 13 at the lower end of the delivery-tube.

When the nature of the material of which the head 2 is constructed does not admit of its being sharpened to form the cutting-edges 4, a suitable knife or cutter, as shown in dotted lines in Fig. 4 of the drawings, at 14, may be used in connection with said head.

The operation of my invention will be readily understood. The fingers extending from the head will engage the stem of the fruit, which will be severed by the cutting-edges without violently shaking the tree, thus detaching only the single fruit, which will drop into the pocket 5 and be conveyed through the sleeve 6 and tube 7 to the bag or receptacle, which may be mounted at the lower end of the latter, or, if preferred, direct to the ground. First, however, the fruit is arrested by the spring 9, under which the operator holds one hand, and which may be cushioned, as shown clearly at 15 in Fig. 3. The fruit is thus stopped in its descent and may be permitted to fall easily and gradually without danger of being bruised, the operator controlling the descent of the fruit by sliding his hand in a downward direction upon the handle to enable the fruit to pass the spring 9.

In Fig. 2 of the drawings I have shown a modification which consists in providing the delivery end of the device with an endless belt 16 extending through the delivery-tube 7, through an opening 17 at the upper end of the latter, and over a roller 18, which is journaled in a yoke 19, which connects the two parts of which the handle is in this instance constructed. Said endless belt is provided with a series of pockets 20. When the fruit descends, it will fall into the uppermost of these pockets within the tube 7, thus partially operating the endless belts and causing the fruit to be carried slowly and easily through the tube 7, escaping at the lower end of the latter. This device may be used separate or in connection with the spring 9, as may be preferred.

Having thus described my invention, I claim and desire to secure by Letters Patent of the United States—

1. In a fruit-picker, the combination, with the handle and the conducting-sleeve, of a spring secured to and normally resting against said handle and adapted to be extended into said sleeve by the pressure of the hand of the operator, substantially as set forth.

2. In a fruit-picker, the combination of the handle, the head having the fingers, the pocket, the conducting-sleeve forming a continuation of said pocket and attached to the handle for the greater portion of its length, and a spring secured to and normally resting against said handle at or above the unattached portion of the sleeve, and having a cushioned outer side, and adapted to be extended into said sleeve by pressure of the hand of the operator, substantially as and for the purpose set forth.

3. In a fruit-picker, the combination of the handle, the conducting-sleeve terminating in a tube at its lower end, a spring secured to the handle and extending into said sleeve, and an endless belt passing through the tube at the lower end of the sleeve, through an opening in said tube, and over a suitably-arranged roller, and a series of pockets mounted upon said endless belt, substantially as and for the purpose set forth.

In testimony whereof I affix my signature in presence of two witnesses.

JOSEPH G. HARRIS.

Witnesses:
H. H. KNAPP,
J. M. BYLER.